United States Patent
Gailus (10) Patent No.: US 12,479,729 B2
(45) Date of Patent: Nov. 25, 2025

(54) IRON REMOVAL FROM CARBON NANOTUBES AND METAL CATALYST RECYCLE

(71) Applicant: Nanocomp Technologies, Inc., The Woodlands, TX (US)

(72) Inventor: David Gailus, Merrick, NH (US)

(73) Assignee: Nanocomp Technologies Inc.

( * ) Notice: Subject to any disclaimer, the term of this patent is extended or adjusted under 35 U.S.C. 154(b) by 437 days.

(21) Appl. No.: 17/801,286

(22) PCT Filed: Feb. 23, 2021

(86) PCT No.: PCT/US2021/019229
§ 371 (c)(1),
(2) Date: Aug. 22, 2022

(87) PCT Pub. No.: WO2021/173549
PCT Pub. Date: Sep. 2, 2021

(65) Prior Publication Data
US 2023/0102474 A1    Mar. 30, 2023

Related U.S. Application Data (60) Provisional application No. 62/980,513, filed on Feb. 24, 2020.

(51) Int. Cl.
*B32B 9/00* (2006.01)
*B01J 31/20* (2006.01)
(Continued)

(52) U.S. Cl.
CPC .............. *C01B 32/17* (2017.08); *B01J 31/20* (2013.01); *C01B 32/159* (2017.08);
(Continued)

(58) Field of Classification Search
CPC ..... C01B 32/17; C01B 32/159; C01B 32/162; Y10T 428/30
(Continued)

(56) References Cited

U.S. PATENT DOCUMENTS

| | | |
|---|---|---|
| 9,556,032 B2 | 1/2017 | Kauppinen et al. |
| 2004/0253374 A1 | 12/2004 | Jung et al. |

(Continued)

FOREIGN PATENT DOCUMENTS

| | | |
|---|---|---|
| CN | 1485271 A | 3/2004 |
| CN | 105060271 A | 11/2015 |

(Continued)

OTHER PUBLICATIONS

Translation of Preliminary Rejection issued Jul. 29, 2024 for corresponding Korean Patent Application. No. 10-2022-7033287.

(Continued)

*Primary Examiner* — Daniel H Miller
(74) *Attorney, Agent, or Firm* — Nanocomp Technologies Inc.; David K. Wooten (57) ABSTRACT

The present disclosure provides a method for purifying nanostructured material comprising carbon nanotubes, metal impurities and amorphous carbon impurities. The method generally includes oxidizing the unpurified nanostructured material to remove the amorphous carbon and thereby exposing the metal impurities and subsequently contacting the nanostructured material with carbon monoxide to volatilize the metal impurities and thereby substantially remove them from the nanostructured material.

13 Claims, 5 Drawing Sheets

(51) Int. Cl.
   *C01B 32/159* (2017.01)
   *C01B 32/162* (2017.01)
   *C01B 32/17* (2017.01)

(52) U.S. Cl.
   CPC ....... *C01B 32/162* (2017.08); *B01J 2231/005* (2013.01); *B01J 2531/842* (2013.01); *C01B 2202/02* (2013.01); *C01B 2202/06* (2013.01); *C01B 2202/30* (2013.01)

(58) Field of Classification Search
   USPC .......................................................... 428/408
   See application file for complete search history.

(56) References Cited

U.S. PATENT DOCUMENTS

| | | |
|---|---|---|
| 2011/0002837 A1 | 1/2011 | Maghrebi et al. |
| 2018/0194950 A1 | 7/2018 | Antoinette et al. |
| 2019/0198887 A1 | 6/2019 | Lee et al. |

FOREIGN PATENT DOCUMENTS

| | | |
|---|---|---|
| JP | S46151 A | 8/1971 |
| JP | 2006182572 A | 7/2006 |
| WO | 2019/100949 A1 | 5/2019 |

OTHER PUBLICATIONS

International Search Report and Written Opinion received in the corresponding PCT Application No. PCT/US2021/019229, completed May 21, 2021 and mailed Jun. 15, 2021.
European Search Report issued Sep. 20, 2024 for corresponding European Patent Application. No. 21760245.7.

IRON REMOVAL FROM CARBON NANOTUBES AND METAL CATALYST RECYCLE

CROSS-REFERENCE TO RELATED APPLICATIONS

The present application is the National Phase of International Application PCT/US2021/019229 filed Feb. 23, 2021 which designated the U.S. and which claims priority to U.S. Provisional Patent Application No. 62/980,513, filed Feb. 24, 2020, the entire contents of which is hereby expressly incorporated by reference.

STATEMENT REGARDING FEDERALLY SPONSORED RESEARCH OR DEVELOPMENT

This invention was made with Government support under DE-AR0001017 awarded by DOE, Office of ARPA-E. The Government has certain rights in this invention.

FIELD

The present disclosure generally relates to methods for purifying carbon nanostructured material containing carbon nanotubes by removing impurities formed during its production, such as particles of a metal catalyst and amorphous carbon, without substantially damaging or destroying the carbon nanotubes.

BACKGROUND

Iron, nickel and cobalt nanoparticles are frequently used as catalysts for promoting the initiation and growth of carbon nanotubes. This is the case in most carbon nanotube synthesis methods including forest growth, floating bed, HIPCO, laser ablation, arc and floating catalyst chemical vapor deposition methods. In many of these methods, including floating catalyst chemical vapor deposition, metal nanoparticles which were successful in creating carbon nanotubes remain attached to the nanotube they created and metal nanoparticles which were not successful, typically because they are too large or too small to initiate carbon nanotube growth, are captured as part of the as-produced nanotube material. Once the carbon nanotube has been formed, these residual metal nanoparticles have no useful contribution to the properties of the carbon nanotube, and in fact are typically considered parasitic mass or worse, chemically or physically undesirable in the as-produced nanotube material. Likewise, these methods also entail the production of varying amounts of carbon material in the as-produced nanotube material that is not in the form of nanotubes. In the following, this non-nanotube carbon material is referred to as "amorphous carbon."

Removal of the residual metal particles and amorphous carbon without causing damage to the nanotubes can be difficult. Typical methods include vacuum or inert gas bake out at high temperatures (i.e., greater than 1600° C.), partial oxidation followed by dissolving of the exposed metal or metal oxide with acids or etchants, and gas phase removal via reaction with a halogen-containing gas. Each of these methods can damage the nanotubes by creating defects, removing beneficial carbon material or graphitizing or otherwise changing the nanotubes themselves.

Therefore, there exists a need for an efficient and safe process for preparing purified carbon nanotubes; in particular, the method should efficiently remove amorphous carbon and metal catalyst impurities at low to moderate temperatures and pressure without damaging or destroying the carbon nanotubes.

SUMMARY

The present disclosure relates to methods for the purification of carbon nanotubes. Known methods of carbon nanotube production result in a carbon nanostructured material that contains carbon nanotubes in addition to impurities including residual metal catalyst particles and amounts of small amorphous carbon sheets that can surround the metal catalyst particles and appear on the side of the carbon nanotubes. The purification method of the present disclosure substantially removes the extraneous amorphous carbon as well as metal-containing residual catalyst particles without damaging or destroying the carbon nanotubes.

Thus, according to one embodiment, the present disclosure is directed to a method of purifying carbon nanostructured material, where such method comprises the steps of: (a) obtaining a quantity of as-produced, unpurified carbon nanostructured material, the unpurified carbon nanostructured material comprising carbon nanotubes and being inherently contaminated with metal catalyst particles and other non-nanotube (i.e. amorphous) carbon structures; (b) oxidizing the unpurified carbon nanostructured material by exposure to carbon dioxide at elevated temperatures, wherein the oxidizing removes the non-nanotube carbon structures to form a carbon dioxide-treated carbon nanostructured material and carbon monoxide; (c) exposing the carbon dioxide-treated carbon nanostructured material to a flowing gas comprising at least the carbon monoxide produced in step (b); (d) raising the temperature of the carbon dioxide-treated carbon nanostructured material and the flowing gas from about 20° C. to about 200° C. to produce a purified carbon nanostructured material and a gaseous stream comprising a volatile metal species; and (e) transporting the gaseous stream away from the purified carbon nanostructured material.

In further embodiments, after the gaseous stream has been transported away from the purified carbon nanostructured material, it is passed through a condenser to condense the volatile metal species and separate out carbon monoxide. The metal species may then be recovered and recycled into a process of forming new as-produced, unpurified carbon nanostructured material and the carbon monoxide may be recycled into the flowing gas of step (c).

DETAILED DESCRIPTION

The present disclosure generally provides a method for producing highly purified carbon nanostructured material in which a metal catalyst used in the production process and amorphous carbon generated in the production process are substantially removed. In one embodiment, the purified carbon nanostructured material contains less than about 10 wt. % metal that was used in producing the unpurified nanostructured material. In another embodiment, the purified carbon nanostructured material contains less than about 8 wt. % of such metal, or less than about 7 wt. % of such metal, or less than about 6 wt. % of such metal, or less than about 5 wt. % of such metal, or less than about 2.5 wt. % of such metal or less than about 1 wt. % of such metal or less than about 0.5 wt. % of such metal, or even less than about 0.1 wt. % of such metal. Additionally, in an embodiment of the present disclosure, the purified carbon nanostructured material contains less than about 10 wt. % amorphous carbon. In another embodiment, the purified carbon nanostructured material contains less than about 5 wt. % amorphous carbon, or less than about 2 wt. % amorphous carbon, or less than about 1 wt. % amorphous carbon, or less than about 0.5 wt. % amorphous carbon or even less than about 0.1 wt. % amorphous carbon.

The purified carbon nanostructured material above may be produced by a method that generally includes the steps of: (a) obtaining a quantity of an as-produced unpurified carbon nanostructured material comprising carbon nanotubes, a metal impurity and amorphous carbon; (b) oxidizing the as-produced unpurified carbon nanostructured material in a gaseous atmosphere comprising carbon dioxide to form carbon monoxide and a carbon dioxide-treated carbon nanostructured material; (c) exposing the carbon dioxide-treated carbon nanostructured material to a flowing gas comprising at least the carbon monoxide formed in step (b); (d) raising the temperature of the carbon dioxide-treated carbon nanostructured material and the flowing gas from about 20° C. to a maximum temperature of about 200° C. to produce a purified carbon nanostructured material and a gaseous stream comprising a volatile metal species; and (e) transporting the gaseous stream away from the purified carbon nanostructured material. The method of the present disclosure is particularly suited for use in connection with unpurified carbon nanostructured material produced from a floating catalyst chemical vapor deposition process. However, the method is also readily adaptable to for use in connection with unpurified carbon nanostructured materials produced by other metal catalytic processes.

The following terms shall have the following meanings:

The term "comprising" and derivatives thereof are not intended to exclude the presence of any additional component, step or procedure, whether or not the same is disclosed herein. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e. to at least one) of the grammatical object of the article.

The phrases "in one embodiment", "according to one embodiment" and the like generally mean the particular feature, structure, or characteristic following the phrase is included in at least one aspect of the present disclosure, and may be included in more than one aspect of the present disclosure. Importantly, such phases do not necessarily refer to the same aspect.

If the specification states a component or feature "may", "can", "could", or "might" be included or have a characteristic, that particular component or feature is not required to be included or have the characteristic.

It should be noted that although reference is made herein to unpurified nanostructured material synthesized from carbon, other compound(s) may be used in connection with the synthesis of nanostructured materials for use with the method of the present disclosure. For example, it is understood that unpurified nanostructured materials synthesized from boron may also be produced in a similar system but with different chemical precursors and then subjected to the method of the present disclosure to purify the nanostructured material.

Furthermore, the present disclosure employs a floating catalyst chemical vapor deposition ("CVD") process to generate the unpurified nanostructured material. Since growth temperatures for the floating catalyst CVD process can be comparatively low ranging, for instance, from about 400° C. to about 1400° C., carbon nanotubes, single wall carbon nanotubes (SWNT), multiwall carbon nanotubes (MWNT) or both, may be grown. Although both SWNT and MWNT may be grown, in certain instances, SWNT may be preferred because of their higher growth rate and tendency to form ropes which may offer handling, safety and strength advantages.

Figure 1A:
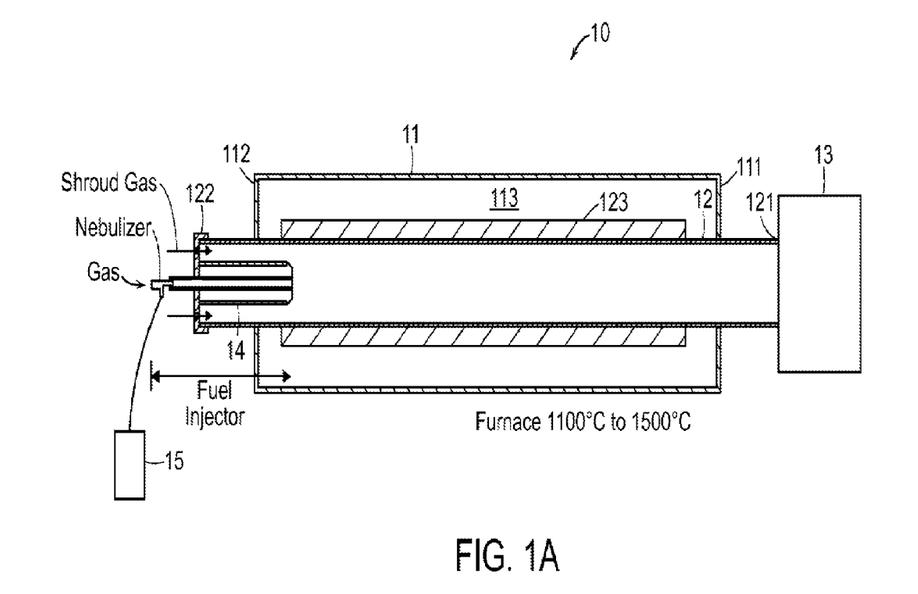
FIG. 1A illustrates a schematic diagram of a floating catalyst chemical vapor deposition system for production of nanostructures in connection with an embodiment of the present disclosure.

Referring now to FIG. 1A, a system 10 is illustrated in which the unpurified carbon nanostructured material comprising carbon nanotubes, a metal impurity and amorphous carbon may be obtained. System 10 includes housing 11 (i.e., furnace) having opposite ends 111 and 112, and a passageway 113 extending between ends 111 and 112. A tube 12 (i.e., reactor) within which the carbon nanostructured material may be generated, may be situated within the passageway 113 of housing 11. As shown in FIG. 1A, ends 121 and 122 of tube 12 may be positioned so that they extend from ends 111 and 112 respectively of housing 11. Housing 11 may include heating elements or mechanisms (not shown) to generate temperatures ranging between about 1000° C. to about 1500° C., which are necessary for the growth of carbon nanotubes within tube 12. As the heating elements must maintain the temperature environment within tube 12 to within a specified range during the synthesis of the carbon nanostructured material, although not illustrated, the system 10 may include a thermocouple on the exterior of tube 12 to monitor the temperature environment within tube 12. The maintenance of the temperature range within tube 12, for e.g., from about 1100° C. to about 1400° C., may be optimized by the use of an insulating structure 123. Insulating structure 123 may be made from, for e.g., zirconia ceramic fibers (e.g., zirconia-stabilized boron nitride). Other insulating materials may also be used.

As the housing 11 and tube 12 must withstand variations in temperature and gas-reactive environments, housing 11 and tube 12 may be manufactured from a strong, substantially gas-impermeable material that is substantially resistant to corrosion. The housing 11 and tube 12 may be made from a quartz or ceramic material, such as, for e.g., Macor® machinable glass ceramic, to provide enhanced shock absorption. Of course, other materials may also be used, so long as the housing 11 and tube 12 can remain impermeable to gas and maintain their non-corrosive character. Also, although illustrated as being cylindrical in shape, housing 11 and tube 12 may be provided with any geometric cross-section.

System 10 may also include a collection unit 13 in fluid communication with end 121 of tube 12 for collecting the nanostructured material generated within tube 12. At opposite end 122 of tube 12, system 10 may include an injector apparatus 14 (i.e., nebulizer) in fluid communication with tube 12. Injector 14 may be designed to receive from a reservoir 15 a fluid mixture of components necessary for the growth of nanostructured material within tube 12. Injector 14 may also be designed to vaporize or fluidize the mixture (i.e., generating small droplets) before directing the mixture into tube 12 for the generation and growth of the nanostructured material.

The fluid mixture, in one embodiment, can include, among other things, (a) a metal catalyst precursor from which a metal catalyst particle can be generated for subsequent growth of the nanostructured material thereon, (b) a conditioner compound for controlling size distribution of metal catalyst particles generated from the metal catalyst precursor, and thus the diameter of the nanostructured material, and (c) a carbon source for depositing carbon atoms onto the metal catalyst particle in order to grow the nanostructured material.

Examples of the metal catalyst precursor from which metal catalyst particles may be generated include ferrocene materials such as iron or iron alloy, nickel, cobalt, their oxides, or their alloys (or compounds with other metals or ceramics).

Alternatively, the metal catalyst particles may be made from metal oxides, such as $Fe_3O_4$, $Fe_2O_4$, or FeO, similar oxides of cobalt or nickel, or a combination thereof.

Examples of the conditioner compound for use in connection with the fluid mixture of the present disclosure include thiophene, $H_2S$, other sulfur containing compounds, or a combination thereof.

Examples of the carbon source for use in connection with the fluid mixture of the present disclosure include, but are not limited to, ethanol, methyl formate, propanol, acetic acid, hexane, methanol, or blends of methanol with ethanol. Other liquid carbon source may also be used, including $C_2H_2$, $CH_3$, and $CH_4$.

Figure 1B:
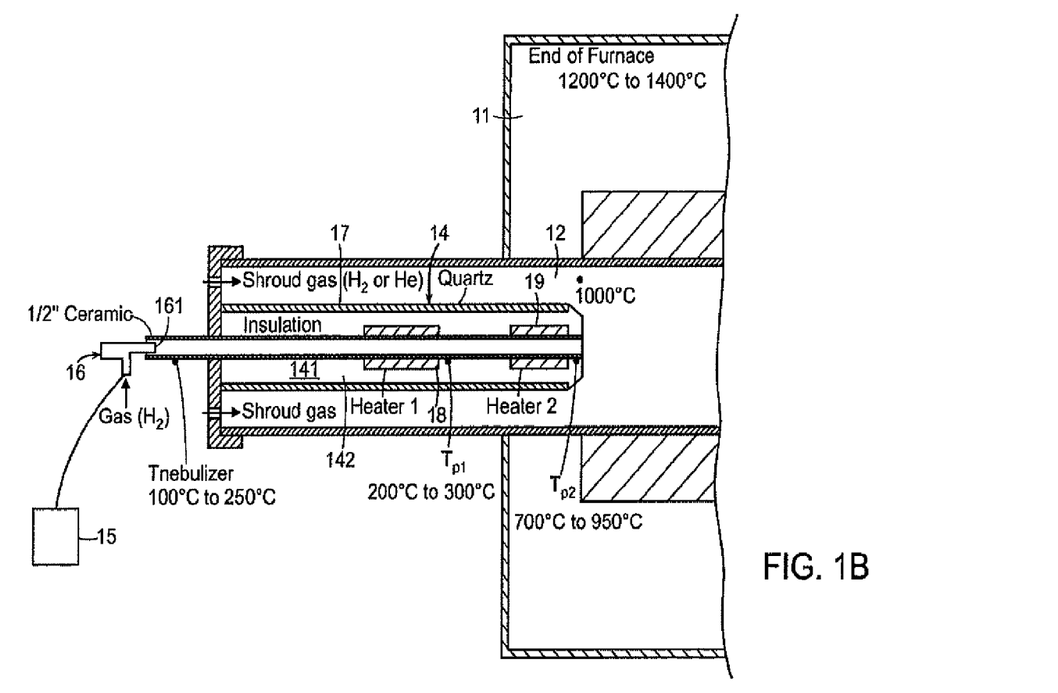
FIG. 1B is a schematic illustration of an injector apparatus for use in connection with the system shown in FIG. 1A.

With reference now to FIG. 1B, there is shown a detailed illustration of injector 14. Injector 14 includes a substantially tubular chamber 141 defining a pathway 142 along which the vaporized fluid mixture may be generated and directed into reactor tube 12. To vaporize or fluidize the mixture, injector 14 may include a nebulizing tube 16 designed to impart a venturi effect in order to generate small droplets from the fluid mixture being introduced from reservoir 15. It should be appreciated that the vaporizing or fluidizing of the fluid mixture may occur substantially as the fluid exits through distal end 161 of nebulizing tube 16. The droplets being generated may range from nanoscale in size to microscale in size. To direct the vaporized fluid mixture along the nebulizing tube 16 into the reactor tube 12, a volume of gas, such as $H_2$, He or any other inert gases, may be used to push the vaporized fluid toward the reactor tube 12.

Although illustrated as substantially tubular, it should be appreciated that injector 14 may be provided with any geometric designs, so long as the injector can accommodate the nebulizing tube 16, and provide a pathway along which the vaporized fluid mixture can be directed into reactor tube 12.

In addition, it should be noted that the injector 14 may be designed to permit introduction of individual components of the fluid mixture into the injector 14 rather than providing them as part of the fluid mixture. In such an embodiment, each component may be individually vaporized, through a nebulizing tube similar to tube 16, and introduced into the injector 14, where they may be allowed to mix and subsequently be directed along the injector 14 in a similar manner to that described above.

As injector 14 is situated within a portion of reactor tube 12 and furnace 11, the heat being generated within tube 12 and furnace 11 may have a negative effect on the temperature environment within injector 14. In order to shield injector 14 from the heat in reactor tube 12 and furnace 11, an insulation package 17 may be provided about injector 14. In particular, insulation package 17 may act to preserve the temperature environment along the length of injector 14.

With the presence of insulation package 17, the temperature environment within injector 14 may be lowered to a range which can affect the various reactions necessary for growing the carbon nanostructured material. To that end, injector 14 may also include a heating zone A situated downstream from the nebulizing tube 16 to provide a temperature range sufficient to permit the formation of metal catalyst particles from the metal catalyst precursors. The heating zone A may include a first heater 18 situated downstream of the distal end 161 of nebulizing tube 16. Heater 18 may be provided to maintain a temperature range at, for instance, $T_{p1}$ necessary to decompose the metal catalyst precursor into its constituent atoms, and which atoms may thereafter cluster into metal catalyst particles on which nanostructures may subsequently be grown. In order to maintain the temperature range at $T_{p1}$ at a level necessary to decompose the metal catalyst precursor, heater 18, in one embodiment, may be situated slightly downstream of $T_{p1}$. In an embodiment where ferrocene is used as a precursor, its constituent atoms (i.e., iron particles), substantially nanoscaled in size, may be generated when the temperature at $T_{p1}$ can be maintained in a range of from about 200° C. to about 300° C.

Heating zone A may further include a second heater 19 positioned downstream of first heater 18, and within furnace 11. Heater 19 may be provided to maintain a temperature range at, for example, $T_{p2}$ necessary to decompose the conditioner compound into its constituent atoms. These atoms, in the presence of the clusters of metal catalyst particles, can interact with the clusters to control the size distribution of the metal catalyst particles, and hence the diameter of the nanostructures being generated. In an embodiment where thiophene is used as a conditioning compound, sulfur may be released upon decomposition of the thiophene to interact with the clusters of metal catalyst particles. Heater 19, in an embodiment, may be designed to maintain a temperature range at $T_{p2}$ from about 700° C. to about 950° C. and to maintain such a range at a location slightly downstream of the heater 19.

In accordance with one embodiment, $T_{p2}$ may be may be located at a desired distance from $T_{p1}$. As various parameters can be come into play, the distance from $T_{p1}$ to $T_{p2}$ should be such that the flow of fluid mixture from $T_{p1}$, where decomposition of the metal catalyst precursor occurs, to $T_{p2}$ can optimize the amount of decomposition of the conditioning compound, in order to optimize the size distribution of the metal catalyst particles.

It should be appreciated that in addition to the particular temperature zones generated by first heater 18 and second heater 19 within injector 14, the temperature at the distal end 161 of nebulizing tube 16 may also need to be maintained within a particular range in the injector 14 in order to avoid either condensation of the vaporized fluid mixture or uneven flow of the fluid mixture as it exits through distal end 161 of nebulizing tube 16. In an embodiment, the temperature at the distal end 161 may need to be maintained between about 100° C. and about 250° C. If, for example, the temperature is below the indicated range, condensation of the fluid mixture may occur along a wall surface of the injector 16. Consequently, the fluid mixture that is directed from the injector 16 into the reactor tube 12 may be substantially different from that of the mixture introduced from reservoir 15. If, for example, the temperature is above the indicated range, boiling of the fluid mixture may occur at the distal end 161, resulting in sputtering and uneven flow of the fluid into the injector 14.

As injector 14 may need to maintain a temperature gradient along its length, whether to minimize condensation of the distal end 161 of the nebulizing tube 16, to maintain the necessary temperature at $T_{p1}$ to permit decomposition of the metal catalyst precursor, or at $T_{p2}$ to permit decomposition of the conditioning compound, insulation package 17, in addition to shielding heat from the reactor tube 12 and furnace 11, can act to maintain the desired temperature gradient along injector 14 at each critical location.

In one embodiment, the insulation package 17 may be made from quartz or similar materials, or from a porous ceramic material, such as zirconia ceramic fibers (for e.g., zirconia-stabilized boron nitride). Other insulating materials may also, of course, be used.

With continued reference to FIG. 1B, system 10 may include at least one inlet through which a carrier gas may be introduced into reactor tube 12. The introduction of a carrier gas into tube 12 may assist in moving the fluid mixture along tube 12 subsequent to its exit from injector 14. In addition, as it may be desirable to minimize turbulent flow or vortex flow associated with the fluid mixture as it exits injector 14, the carrier gas may be permitted to flow along the reactor tube 12 and along an exterior surface of injector 14. In an embodiment the carrier gas may be permitted to flow at a speed substantially similar to that of the fluid mixture, as the mixture exits the injector 14, to permit the fluid mixture to maintain a substantially laminar flow. By maintaining a substantially laminar flow, growth and strength of the nanostructures being produced may be optimized. In an embodiment, the carrier gas may be $H_2$, He or any other inert gas.

To further minimize turbulent flow or vortex flow as the fluid mixture exits the injector 14, insulation package 17 may be provided with a substantially tapered design about distal end of injector 14. Alternatively, or in addition, an extension (not shown) may be situated about distal end of injector 14 to expand the flow of the fluid mixture substantially radially away from the center of the injector 14 as the fluid mixture exits the distal end of the injector. The presence of such an extension can slow down flow velocity of the fluid mixture and allow the flow pattern to remain substantially laminar.

It should be appreciated that the injector 14 may be designed to decompose the metal catalyst precursor at $T_{p1}$ and the conditioning compound at $T_{p2}$ as the fluid mixture moves along injector 14. However, the carbon source necessary for nanostructured growth does not get decomposed and may remain substantially chemically unchanged as the fluid mixture moves along injector 14.

However, since the distal end of injector 14 protrudes into furnace 11, as seen in FIGS. 1A-B, its proximity to a substantially higher temperature range within the furnace 11, and thus reactor tube 12, can expose the carbon source immediately to a temperature range necessary to decompose the carbon source, upon its exiting through the distal end of the injector 14, for subsequent nanostructure growth. In an embodiment, the temperature range at interface 142 between distal end of the injector and furnace 11 may be from about 1000° C. to about 1250° C.

Figure 1C:
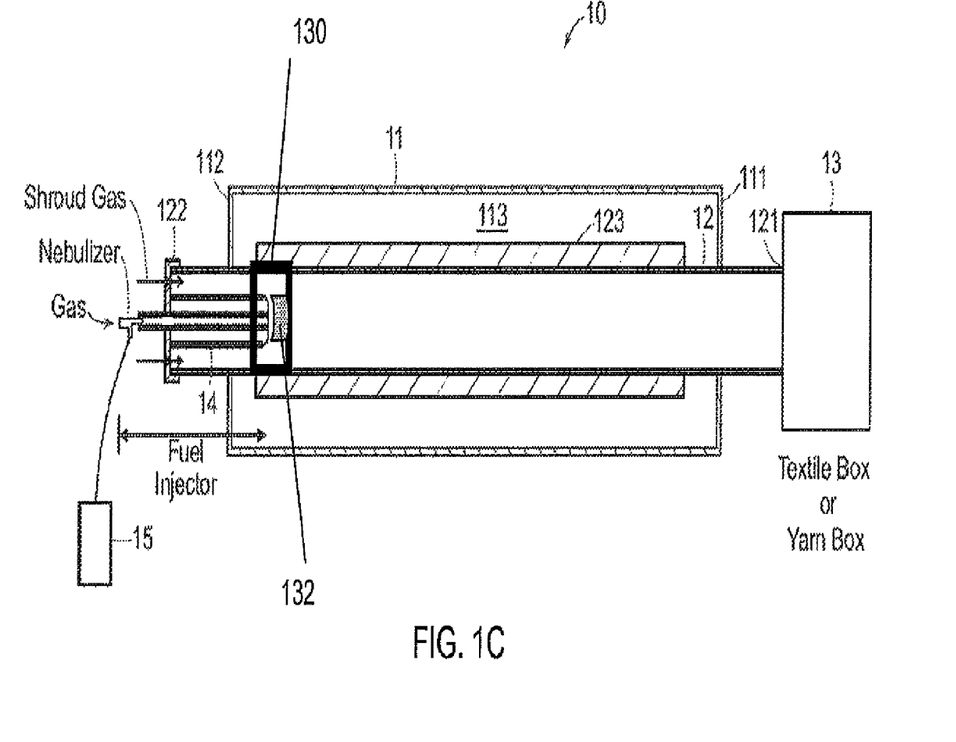
FIG. 1C illustrates a schematic diagram of a floating catalyst chemical vapor deposition system utilizing a plasma generator for production of nanostructures in connection with an embodiment of the present disclosure.

With reference to FIG. 1C, a plasma generator 130 may be disposed about the distal end of the injector 14. In this manner, the fluid mixture may be passed through a plasma flame 132 of the plasma generator 130 before entering the reactor tube 12. In an embodiment, there may be provided hermetic seals or fluid tight seals around the junctions between the plasma generator 130 and the injector 14, as well as between the plasma generator 130 and the reactor tube 12 to prevent gases and particles in the fluid mixture from escaping from the system 10. In one embodiment, the plasma generator 130 may be in an axial or linear alignment with the tubular chamber 141 of the injector 14 to provide an efficient flow path for the fluid mixture from the injector 14 and through the plasma generator 130. In an embodiment, the alignment of the plasma generator 130 with the injector 14 is such that the fluid mixture is allowed to pass substantially through the middle of the plasma generator 130. In some embodiments, this may lead to the fluid mixture passing through the middle region of the plasma flame 132, which may have a more uniform temperature profile than the outer regions of the plasma flame 130. The plasma generator 130 may also be in an axial or linear alignment with the reactor tube 12.

In an embodiment, the plasma generator 130 may provide concentrated energy, in the form of the plasma flame 132, to increase the temperature of the fluid mixture to a temperature higher than the temperature range in the injector 14. In an embodiment, the plasma generator 130 can increase the temperature of the fluid mixture to a level sufficient to decompose the carbon source into its constituent atoms for activation of nanostructure growth. In an embodiment, the plasma generator 130 may operate between about 1200° C. and about 1700° C. Because the temperature of the plasma flame 132 is substantially higher than the temperature in the injector 14, the heat generated by the plasma flame 132 may have a negative effect on the temperature environment within the injector 14. To that end, the plasma generator may be provided with a heat shield 160 (see FIG. 1D) situated between the region of the plasma generator 130 where the plasma flame 132 is generated and the injector 14 to preserve the temperature environment along the length of injector 14. In one embodiment, the heat shield 160 may be made from a porous ceramic material, such as zirconia ceramic fibers (e.g., zirconia-stabilized boron nitride). Other insulating materials may, of course, also be used.

Because the plasma generator 130 may provide concentrated energy to the fluid mixture thereby initiating quicker decomposition of the carbon source, in one embodiment, a shorter reactor tube 12, the furnace 11, or both may be used and still generate nanotubes of sufficient length. Of course to the extent desired, reactor tube 12, the furnace 11, or both may be provided with similar or longer lengths than in systems without a plasma generator. In an embodiment, utilizing the plasma generator 130 in the process may enable production of longer carbon nanotubes.

It should also be noted that in some embodiments, the injector 14 and plasma generator 130 may be utilized with minimal heat or without additional heat in the reaction tube 12. It should also be noted that multiple plasma generators may be utilized in the system 10 to provide a desired temperature gradient over a travel distance of the fluid mixture.

Figure 1D:
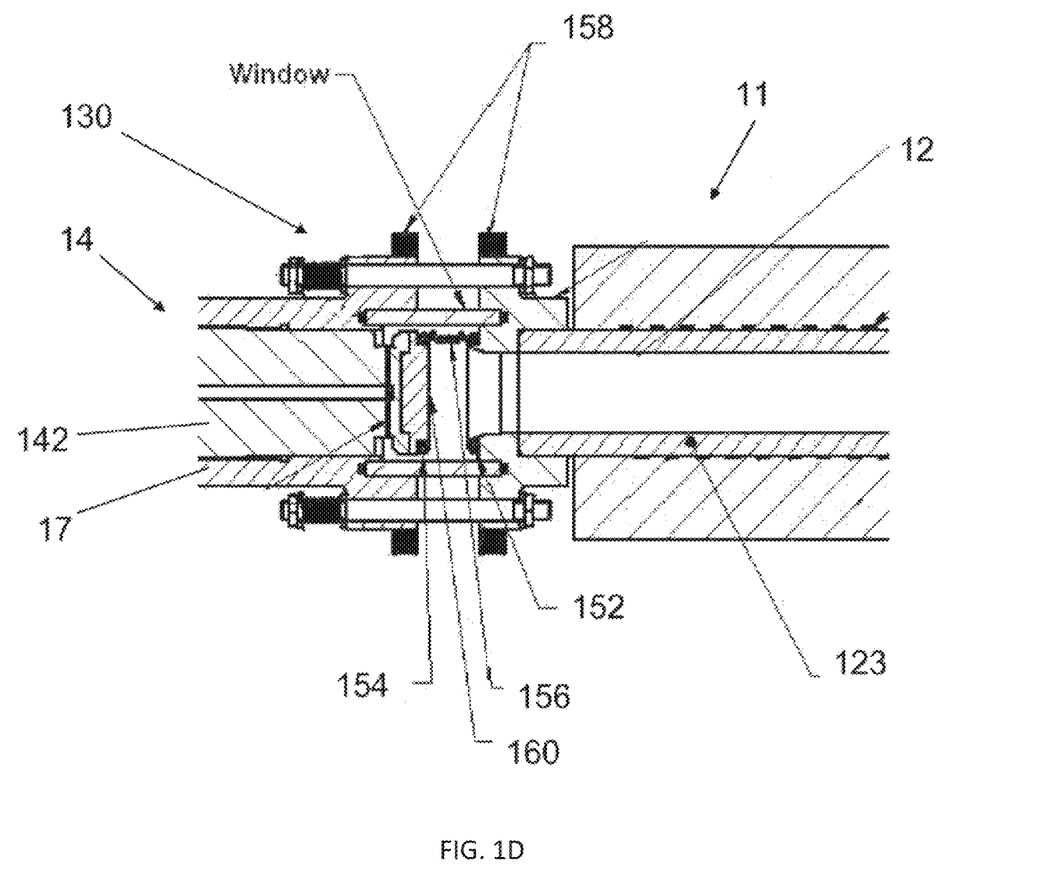
FIG. 1D illustrates a schematic diagram of a plasma generator suitable for use in connection with the system of FIG. 1C.

FIG. 1D illustrates one embodiment of the plasma generator 130. In an embodiment, the plasma generator 130 may be a direct current (DC) power generator. The plasma generator 130 may include an anode 152 and a cathode 154, which can be cooled by water or another cooling fluid or another material that may act as a heat sink to transfer the heat away from the electrodes 152, 154. In an embodiment, the electrodes 152, 154 may be high diffusivity-metal electrodes, such as typically made of copper or silver. Plasma gas may flow around the anode 152 and cathode 154 and may be ionized by an electric arc 156 initiated between the anode 152 and cathode 154 to create plasma flame 132. Suitable plasma gasses may be either reactive or non-reactive and may include, but are not limited, argon oxygen, nitrogen, helium, hydrogen or another gas. In an embodiment, the plasma generator 130 may include one or more Helmholtz coils 158 or another device for producing magnetic field for rotating the arc 156. In such an embodiment, the anode 152 and cathode 154 may be provided with an annular shape to facilitate rotation of the arc 156. While FIG. 1D illustrates one suitable embodiment of a plasma generator, other designs and types of plasma generators (i.e. radio frequency, alternating current and other discharges plasma generators) may be implemented.

In an embodiment, the Helmholtz coils 158 can be used to generate an electromagnetic or electrostatic field for in situ alignment of the nanotubes downstream of the plasma generator 130 in the reactor chamber 12. Additionally or alternatively, the electromagnetic field created by the plasma generator 130 can act to deflect the carbon nanotubes towards the axis of the reaction tube 12 by generating a torque on the carbon nanotubes, packing the carbon nanotubes towards such axis. In an embodiment the plasma generator 130 can also be designed to push or focus the cloud of carbon nanotubes into a smaller radial volume as the cloud of carbon nanotubes proceeds through the reaction tube 12. In an embodiment, particles from which carbon nanotubes grow can be charged by a particle charger so that the particles can respond to electrostatic forces.

To the extent more than one plasma generator 130 is used, the plasma generators field strength and position can be optimized to align the carbon nanotubes. Additionally or alternatively, the power generators may be in linear alignment with one another, and each successive downstream plasma generator may be configured to generate a stronger electrostatic field, so as to force or condense the flowing cloud of carbon nanotubes toward a smaller radial volume, while moving the carbon nanotubes in a substantial axial alignment with the reaction tube 12. In some embodiments, the successive plasma generators can also be used to control the flow acceleration or deceleration, allowing the nanotubes to radially condense toward a filament like shape. Such an approach toward condensing the flow of carbon nanotubes can force the carbon nanotubes to be in closer proximity to enhance contact between adjacent nanotubes. Contacts between adjacent carbon nanotubes can be further enhanced via non-covalent interactions between the carbon nanotubes, such as London dispersion forces or van der Waals forces.

In operation, a number of processes may be occurring in a region between the nebulizing tube 16 and the main furnace 11 of system 10. For instance, initially, the fluid mixture of metal catalyst precursor, conditioning compound and carbon source may be introduced from reservoir 15 into injector 14 by way of nebulizing tube 16. To assist in directing the mixture along the nebulizing tube 16, an inert gas, such as $H_2$ or He may be used. As the fluid mixture moves along the nebulizing tube 16 and exits therefrom, tube 16 can impart a venturi effect to vaporize the fluid mixture (i.e., generate droplets from the fluid mixture). To minimize any occurrences of condensation or boiling as the fluid mixture exits the nebulizing tube 16, such an area within the injector 14 may be maintained at a temperature level ranging from about 100° C. to about 250° C.

In an embodiment, an additive for the carbon source may be included in the fluid mixture to optimize growth conditions, as well as enhancing the strength of carbon nanotube material made from the carbon nanotubes being produced. Examples of additives include, but are not limited to, $C_{60}$, $C_{70}$, $C_{72}$, $C_{84}$, and $C_{100}$.

The vaporized fluid mixture may then proceed along the injector 14 toward the first heater 18 where the temperature may be maintained at $T_{p1}$ at levels ranging from about 200° C. to about 300° C., the metal catalyst precursor within the fluid mixture may be decomposed, releasing its constituent atoms. The decomposition temperature of the metal catalyst precursor, in an embodiment, can be dependent on the carrier gas (for e.g., $H_2$ or He), and may depend on the presence of other species. The constituent atoms may subsequently cluster into metal catalyst particles of a characteristic size distribution. This size distribution of the metal catalyst particles can, in general, evolve during migration through the injector 14 and into the furnace 11.

Next, the fluid mixture may proceed further downstream along the injector 14 toward the second heater 19. The second heater 19, in an embodiment, may maintain the temperature at $T_{p2}$ at a level ranging from about 700° C. to about 950° C. where the conditioning compound may decompose into its constituent atoms. The constituent atoms of the conditioning compound may then react with the clusters of metal catalyst particles to effectuate the size distribution of the clusters of metal catalyst particles. In particular, the constituent atoms of the conditioning compound can act to stop the growth and/or inhibit evaporation of the metal catalyst particles. In an embodiment, the constituent atoms of the conditioning compounds along with $H_2$ in the injector 14 may interact with the clusters of metal catalyst particles to affect size distribution of the metal catalyst particles.

It should be appreciated that the carbon source within the fluid mixture may remain chemically unchanged or otherwise not decomposed within injector 14, as the fluid mixture travels along the entire length of the injector 14.

The conditioned metal catalyst particles once moved beyond the second heater 19 may thereafter move across interface 142 between distal end 141 of injector 14 and furnace 11 to enter into the main portion of reactor tube 12. Upon exiting the injector 14, the conditioned metal catalyst particles, along with the carbon source, may maintain a substantially laminar flow in the presence of a carrier gas, such as $H_2$ or He. In the presence of the carrier gas, the conditioned metal catalyst particles may be diluted by the volume of carrier gas.

In addition, upon entry into the main portion of the reactor tube 12, where the temperature range within the reactor tube 12 may be maintained at a level sufficient to decompose the carbon source into its constituent carbon atoms, the presence of the carbon atoms can activate nanostructure growth. In an embodiment, the temperature range may be from about 1000° C. to about 1250° C. In general, growth occurs when the carbon atoms attach themselves substantially sequentially upon the metal catalyst particles to form a nanostructure, such as a carbon nanotube.

In an embodiment, the fluid mixture from the injector 14 may be passed through the plasma generator 130 before entering the reactor tube 12.

Growth of the nanostructures may end when the metal catalyst particles become inactive, the concentration of constituent carbon atoms near the metal catalyst particles is reduced to a relatively low value, or the temperature drops as the mixture moves beyond an area within the reactor tube 12 where the temperature range is maintained at a sufficient level for growth.

Figure 2:
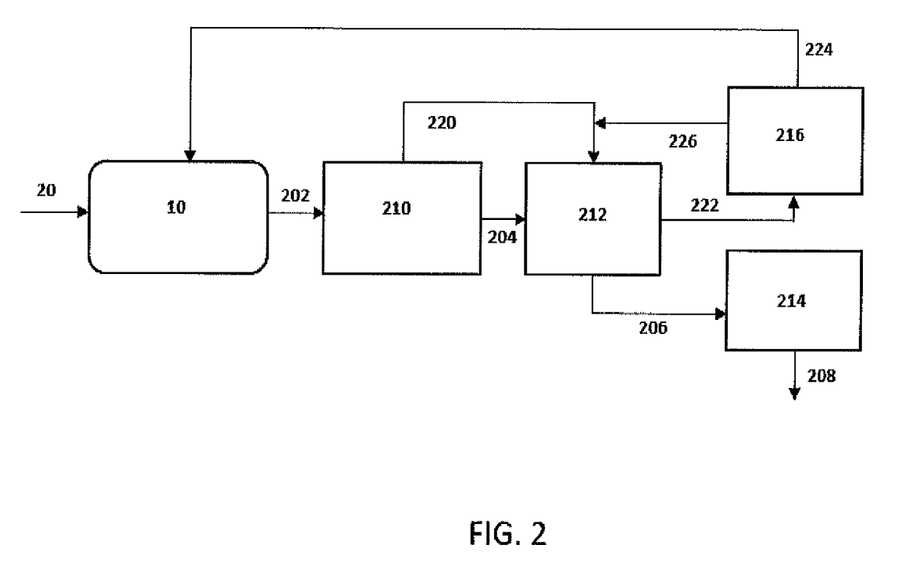
FIG. 2 schematically depicts a flow diagram of the various steps of the method of the present disclosure.

With reference now to FIG. 2, the unpurified carbon nanostructured material 202 produced from the fluid mixture 20 (including, among other things, (a) a metal catalyst precursor (b) a conditioner compound, and (c) a carbon source) in system 10 as described above and which comprises carbon nanotubes, a metal impurity and amorphous carbon is charged to a vessel and oxidized in a gaseous atmosphere comprising carbon dioxide in an oxidation step 210 to remove the amorphous carbon from the nanostructured material 202 and produce carbon monoxide according to the following reaction:

$$C + CO_2 \rightarrow CO.$$

Oxidation can occur at temperatures of at least about 150° C. to about 500° C. and pressures ranging between about 0.01-100 atmospheres. The oxidation step 210 serves a two-fold purpose. The first purpose is to remove the amorphous carbon from the nanostructured material 202 to thereby expose the metal impurity (i.e. metal catalyst particles) which in one particular embodiment comprises iron, and the second purpose is the production of carbon monoxide 220 which is used to subsequently convert the exposed iron into iron pentacarbonyl.

The carbon dioxide concentration in the gaseous atmosphere can range from about 1 volume % to about 100 volume %, or from about 1 volume % to about 30 volume %. Nitrogen or inert gases, such as argon, may be used to dilute the carbon dioxide concentration. The oxidation time can range from about 0.1 hours to about 20 hours. Shorter times are preferable. Water vapor can also be added to the oxidizing gaseous atmosphere and the water vapor concentration can range up to the saturation limit of the gas used in introducing the water vapor. The water vapor concentration in the gaseous atmosphere can range from about 0.5 volume % to about 50 volume %, or from about 0.5 volume % to about 10 volume %, and, more commonly, from about 0.5 volume % to about 5 volume %.

After the removal of amorphous carbon, the carbon dioxide-treated carbon nanostructured material 204 is exposed to a flowing gas comprising at least the carbon monoxide 220 formed in the oxidation step above in an elevated temperature/pressure soak step 212.

Upon exposure to carbon monoxide, the metal impurity (iron for the embodiment shown in FIG. 2) found within the carbon dioxide-treated carbon nanostructured material 204 is converted to iron pentacarbonyl according to the following reaction:

$$Fe(s) + 5CO(gas) \rightarrow Fe(CO)_5$$

In order to aid in the rate and completeness of reaction with the metal, a large excess of carbon monoxide, for example at least 500 mol percent is preferably used, which is considerably more than the stoichiometric quantity needed to react with the contaminating metal in the carbon nanostructured material 204. The reaction is generally carried out at a temperature of at least 100° C., or at least 130° C., or even at least 140° C., and also generally at most 200° C., or at most 170° C. or even at most 160° C. An example of a suitable temperature is 150° C. The pressure of the flowing gas is generally at least 5 MPa (50 bar), or at least 10 MPa (100 bar) or even at least 12 MPa (120 bar), and also generally at most 25 MPa (250 bar), or at most 20 MPa (200 bar) or even at most 18 MPa (180 bar). An example of a suitable pressure is 15 MPa (150 bar). If inert gases are present in addition to carbon monoxide, these values are set as the partial carbon monoxide pressure.

The iron pentacarbonyl formed above vaporizes under the temperatures and pressures above and can be taken away as a gaseous stream 222. The carbon nanostructured material 206 can then be harvested batchwise or continuously in step 214 to produce the purified carbon nanostructured material product 208

According to further embodiments, the iron pentacarbonyl can be recovered in a circulating condenser and recycled into the process of producing new unpurified carbon nanostructured material where it is used as a catalyst source. Thus, the gaseous stream 222 that is taken away from the carbon nanostructured material 206 can be sent to a condenser in step 216 which effects condensation of the gaseous stream 222 and permits separation of the condensate from water by gravity. At separation, the condensed iron pentacarbonyl particles 224 can be passed back into system 10 for producing new unpurified carbon nanostructured material. The gaseous stream 222 will also generally contain carbon monoxide and this will, of course, be present when passing the gaseous stream 222 to the condenser. While carbon monoxide will dissolve to some extent in the water of the condenser, the water will become saturated therewith and a vapor pressure of such gas will be built up outside of the water allowing the carbon monoxide to be separated and exit the condenser as a gas stream 226 where it may be added to the carbon monoxide flowing gas 220 for step 212.

Benefits of the method of the present disclosure include, but are not limited to, the possibility of generating sufficient carbon monoxide needed for forming the carbonyl formation step in situ during the oxidation step. This may not only reduce the overall carbon emissions of the method, but may also reduce the need for a separate carbon monoxide feedstock.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A method of purifying carbon nanostructured material comprising the steps of: (a) obtaining a quantity of unpurified carbon nanostructured material, the unpurified carbon nanostructured material being contaminated with metal catalyst particles and amorphous carbon structures; (b) oxidizing the unpurified carbon nanostructured material by exposure to carbon dioxide at an elevated temperature, wherein the oxidizing removes the amorphous carbon structures to form a carbon dioxide-treated carbon nanostructured material and carbon monoxide; (c) exposing the carbon dioxide-treated carbon nanostructured material to a flowing gas comprising at least the carbon monoxide produced in step (b), wherein at least 500 mol % excess of carbon monoxide is used with respect to the stoichiometric quantity needed to react with the contaminating metal in the carbon nanostructured material; (d) raising the temperature of the carbon dioxide-treated carbon nanostructured material and the flowing gas from about 20° C. to about 200° C. to produce a purified carbon nanostructured material and a gaseous stream comprising a volatile metal species, wherein the carbon monoxide's pressure in the flowing gas is of 50-120 bar and the purified carbon nanostructured material contains less than about 10 wt. % metal catalyst; and (e) transporting the gaseous stream away from the purified carbon nanostructured material.

2. The method of claim 1, wherein the quantity of unpurified carbon nanostructured material is obtained from a floating catalyst chemical vapor deposition process.

3. The method of claim 1, wherein the metal catalyst particles comprise iron.

4. The method of claim 1, wherein the oxidation in step (b) occurs at a temperature of at least about 150° C. to about 500° C. and at a pressure ranging between about 0.01-100 atmospheres.

5. The method of claim 1, wherein the temperature of the carbon dioxide-treated carbon nanostructured material and the flowing gas is raised to at least 150° C.

6. The method of claim 1, wherein pressure of flowing gas in step (c) is at least 50 bar.

7. The method of claim 2, wherein the volatile metal species comprises iron pentacarbonyl.

8. The method of claim 7, wherein the method further comprises: step (f) passing the gaseous stream to a condenser to condense the iron pentacarbonyl.

9. The method of claim 8, wherein the condensed iron pentacarbonyl is recycled into the floating catalyst chemical vapor deposition process for producing a new quantity of unpurified carbon nanostructured material.

10. The method of claim 8, wherein the passing the gaseous stream to the condenser produces a stream of carbon monoxide exiting the condenser.

11. The method of claim 10, wherein the stream of carbon monoxide is added to the flowing gas of step (c).

12. The method of claim 1, wherein the purified carbon nanostructured material contains less than about 10 wt. % amorphous carbon.

13. The method of claim 1, wherein the carbon nanostructured material comprises single wall carbon nanotubes, multiwall carbon nanotubes or both.

* * * * *